United States Patent
Wu et al.

(10) Patent No.: US 10,277,707 B2
(45) Date of Patent: Apr. 30, 2019

(54) MEMCACHED SYSTEMS HAVING LOCAL CACHES

(71) Applicants: Intel Corporation, Santa Clara, CA (US); Xiangbin Wu, Beijing (CN); Shunyu Zhu, Beijing (CN); Yingzhe Shen, Beijing (CN); Tin-Fook Ngai, San Jose, CA (US)

(72) Inventors: Xiangbin Wu, Beijing (CN); Shunyu Zhu, Beijing (CN); Yingzhe Shen, Beijing (CN); Tin-Fook Ngai, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 399 days.

(21) Appl. No.: 14/778,026

(22) PCT Filed: Jun. 26, 2014

(86) PCT No.: PCT/CN2014/080824
§ 371 (c)(1),
(2) Date: Sep. 17, 2015

(87) PCT Pub. No.: WO2015/196413
PCT Pub. Date: Dec. 30, 2015

(65) Prior Publication Data
US 2016/0285997 A1    Sep. 29, 2016

(51) Int. Cl.
*G06F 15/167* (2006.01)
*H04L 29/08* (2006.01)
(Continued)

(52) U.S. Cl.
CPC .... *H04L 67/2852* (2013.01); *G06F 17/30902* (2013.01); *H04L 67/10* (2013.01); *H04L 67/42* (2013.01)

(58) Field of Classification Search
USPC ............... 709/212, 213, 214, 216
See application file for complete search history.

(56) References Cited

U.S. PATENT DOCUMENTS

| 6,292,880 B1 | 9/2001 | Mattis et al. |
| 2010/0299553 A1 | 11/2010 | Cen |

(Continued)

FOREIGN PATENT DOCUMENTS

| CN | 101562543 A | 10/2009 |
| CN | 102682037 A | 9/2012 |

(Continued)

OTHER PUBLICATIONS

Office Action dated Oct. 31, 2017 for Japanese Application No. 2016-568394, 5 pages.

(Continued)

*Primary Examiner* — Lan Dai T Truong
(74) *Attorney, Agent, or Firm* — Schwabe, Williamson & Wyatt, P.C.

(57) ABSTRACT

Apparatuses, methods and storage medium associated with a memcached system are disclosed herewith. In embodiments, a client device of the memcached system may include memory and one or more processors coupled with the memory. Further, the client device may include memcached logic configured to receive a request to Get or Set a value corresponding to a key in the memcached system, determine, in response to the receive, whether the key results in a hit in a local cache maintained in memory by the memcached logic, and service the Get or Set request based at least in part on whether a result of the determine indicates the key results in a hit in the local cache. In embodiments, a server of the memcached system may include complement memcached logic to server a Get, Set or an Update request. Other embodiments may be described and/or claimed.

20 Claims, 7 Drawing Sheets

(51) Int. Cl.
     *G06F 17/30*      (2006.01)
     *H04L 29/06*      (2006.01)

(56)              References Cited

U.S. PATENT DOCUMENTS

| | | |
|---|---|---|
| 2010/0306256 A1 | 12/2010 | Blackman |
| 2011/0082908 A1* | 4/2011 | Ban .................... G06F 12/0813 709/213 |
| 2013/0054869 A1* | 2/2013 | Tolia .................. G06F 12/0871 711/102 |
| 2013/0326133 A1 | 12/2013 | Lee et al. |
| 2014/0059284 A1* | 2/2014 | Fang ...................... G06F 12/02 711/104 |
| 2014/0337459 A1* | 11/2014 | Kuang ................ H04L 67/2842 709/213 |
| 2015/0178243 A1* | 6/2015 | Lowery ................ G06F 3/0619 709/212 |
| 2015/0180963 A1* | 6/2015 | Luecke .................. H04L 67/06 709/203 |

FOREIGN PATENT DOCUMENTS

| | | |
|---|---|---|
| CN | 103166997 A | 6/2013 |
| CN | 103729447 A | 4/2014 |
| JP | 2012-528382 A | 11/2012 |

OTHER PUBLICATIONS

International Search Report and Written Opinion dated Mar. 27, 2015 for International Application No. PCT/CN2014/080824, 16 pages.

Office Action dated Dec. 27, 2018 for Korean Patent Application No. 10-2016-7033107, 4 pages.

\* cited by examiner

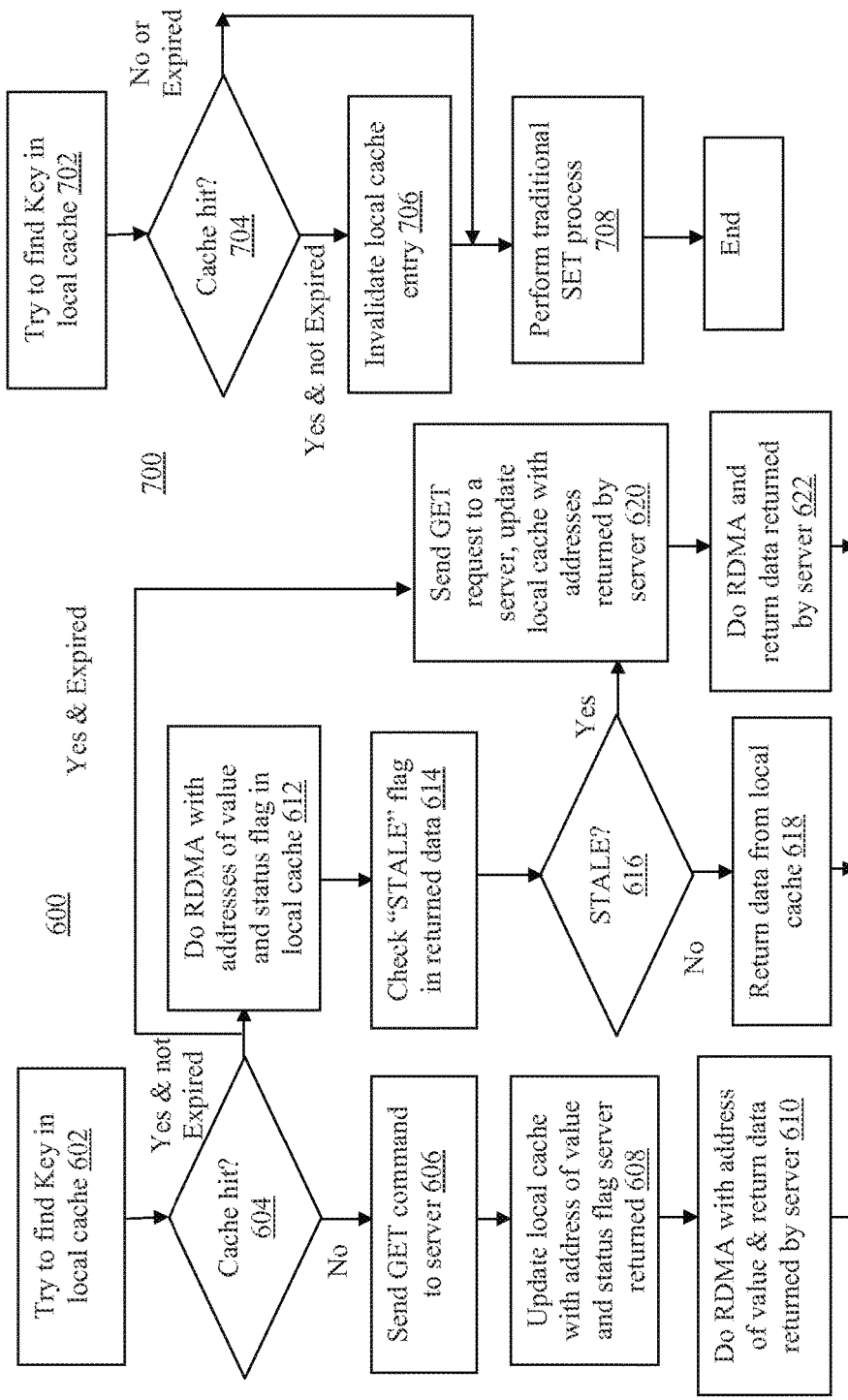

MEMCACHED SYSTEMS HAVING LOCAL CACHES

CROSS REFERENCE TO RELATED APPLICATIONS

The present application is a national phase entry under 35 U.S.C. § 371 of International Application No. PCT/CN2014/080824, filed Jun. 26, 2014, entitled "MEMCACHED SYSTEMS HAVING LOCAL CACHES", which designated, among the various States, the United States of America. The Specification of the PCT/CN2014/080824 Application is hereby fully incorporated by reference.

TECHNICAL FIELD

The present disclosure relates to the field of data processing. More particularly, the present disclosure relates to memcached systems with local caches.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

In computing, memcached is a general-purpose distributed memory caching system. It is often used to speed up dynamic database-driven websites by caching data and objects in random access memory (RAM) to reduce the number of times an external data source (such as a database) must be read. Most systems use a client-server architecture that includes multiple clients and servers. The servers maintain a key-value associative array; the clients populate this array and query it. Clients use client-side libraries to contact the servers. Each client knows all servers; the servers typically do not communicate with each other. If a client wishes to set or read the value corresponding to a certain key, the client's library first computes a hash of the key to determine the server to use. Then it contacts that server. The server will compute a second hash of the key to determine where to store or read the corresponding value. Typically, the servers keep the values in RAM; if a server runs out of RAM, it discards the oldest values.

For large web applications, e.g., web applications with millions of users, hundred of memcached servers may be necessary to timely service the page requests. To meet business requirements, the service operator not only needs to provide a total memory size as large as possible to meet desired service level agreements (SLA), but also needs a lot of CPU power to handle the memory access requests, which often includes GET, SET, UPDATE, among others.

Due to the CPU limitations, a memcached server typically cannot fully utilize the physical capacity of the implementing memories. Instead, operators need to spread load across multiple memcached servers to achieve expected load balance and thus SLAs. This leads to at least two problems: 1) poor memory bandwidth usage; and 2) poor scalability. Also, due to heavy CPU involvement, overhead for each memory access is high. This leads to poor power efficiency per every Key-Value pair access. Thirdly, access pattern for memcached is usually highly random, that makes CPU caching for data stored in memcached almost useless, but a waste of cycles and power.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

FIGS. 5-7 are flow diagrams illustrating various operation flows of the memcached logic on a client, according to the disclosed embodiments.

DETAILED DESCRIPTION

Figure 1:
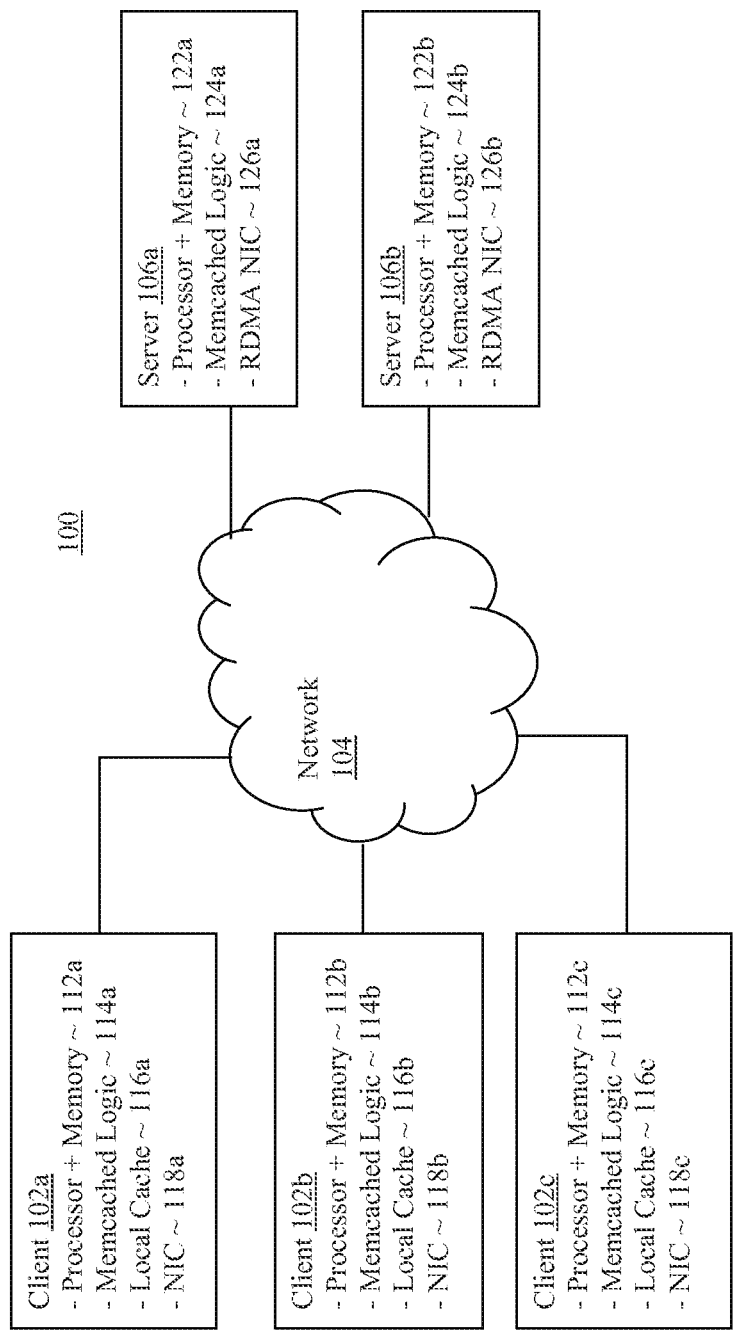
FIG. 1 is a block diagram showing a computing arrangement with a memcached system having local caches, according to the disclosed embodiments.

Apparatuses, methods and storage medium associated with a memcached system having local caches are disclosed herewith. In embodiments, a client device of the memcached system may include memory and one or more processors coupled with the memory. Further, the client device may include memcached logic configured to receive a request to Get or Set a value corresponding to a key in the memcached system, determine, in response to receipt of the request, whether the key results in a hit in a local cache maintained in memory by the memcached logic, and service the Get or Set request based at least in part on whether a result of the determine indicates the key results in a hit in the local cache.

In embodiments, a server of the memcached system may include memory, and one or more processors. Further the memcached system may further include memcached logic configured to receive a request to Get a value corresponding to a key in the memcached system, determine whether the key results in a hit, and in response to the key resulting in a hit, return one or more addresses of one or more locations of the memcached system where the value and a status flag associated with the value are stored. In embodiments, the memcached logic may be further configured to receive a request to Update a second key in the memcached system with a second corresponding value, determine whether the second key results in a hit, and in response to the second key resulting in a hit, update a second status flag associated with a first item that yields the hit for the second key with a stale status, add the first item to a collect list, create a second item for the second key, and assign the second item with the second value.

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Aspects of the disclosure are disclosed in the accompanying description. Alternate embodiments of the present disclosure and their equivalents may be devised without parting from the spirit or scope of the present disclosure. It should be noted that like elements disclosed below are indicated by like reference numbers in the drawings.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the term "module" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

Referring now to FIG. 1, wherein a block diagram showing a computing arrangement with a memcached system having local caches, according to the disclosed embodiments, is illustrated. As shown, computing arrangement 100 with the memcached system may include a number of client devices 102a-102c and a number of servers 106a-106b coupled with each other through network 104. Each client device 102a, 102b or 102c may include corresponding processor and memory 112a, 112b or 112c, client side memcached logic 114a, 114b, or 114c, local caches 116a, 116b or 116c, and network interface cards (NIC) 118a, 118b or 118c. Whereas, each server 106a or 106b may include corresponding processor and memory 122a or 122b, server side memcached logic 124a, or 124b, and remote direct memory access (RDMA) NIC 126a or 126b. Together, client side memcached logic 114a, 114b, and 114c, and server side memcached logic 124a and 124b implement a memcached system with local caches 116a, 116b, and 116c, providing potential advantages over existing memcached systems. The operation flows of client side memcached logic 114a, 114b, and 114c, and server side memcached logic 124a and 124b, including the usage and maintenance of local caches 116a, 116b and 116c, as well as usage of NICs 118a-118c and RDMA NICs 126a-126b, will be described in more detail below.

Except for client side memcached logic 114a, 114b, or 114c, and the instantiations of local cache 116a, 116b or 116c, client device 102a, 102b or 102c is intended to represent a broad range of computing devices known in the art, including but are not limited, smartphones, computing tablets, ultrabooks, laptops, desktop computers or servers, available from Apple Computers of Cupertino, Calif., Hewlett Packard of Palo Alto, Calif., and so forth. Thus, processor and memory 112a-112c and NICs 118a-118c may be any one of a number of these elements known in the art.

Similarly, except for server memcached logic 124a or 124b, server 106a or 106b is intended to represent a broad range of computing devices known in the art, including but are not limited, servers available from Dell Computer of Austin, Tex., IBM of Armonk, N.Y., and so forth. While for ease of understanding, computing arrangement 100 is illustrated and being described with three client devices 102a, 102b and 102c, and two servers 106a and 106b, the disclosure is not so limited. In embodiment, computing arrangement 100 may include any number of client devices and any number of servers. Thus, processor and memory 122a-122c and RDMA NICs 126a-126b may be any one of a number of these elements known in the art.

Network 104 may include one or more wired and/or wireless, local and/or wide area, public and/or private networks known in the art. Each of the networks may include one or more routers, switches, gateways and/or other networking devices.

Figure 2:
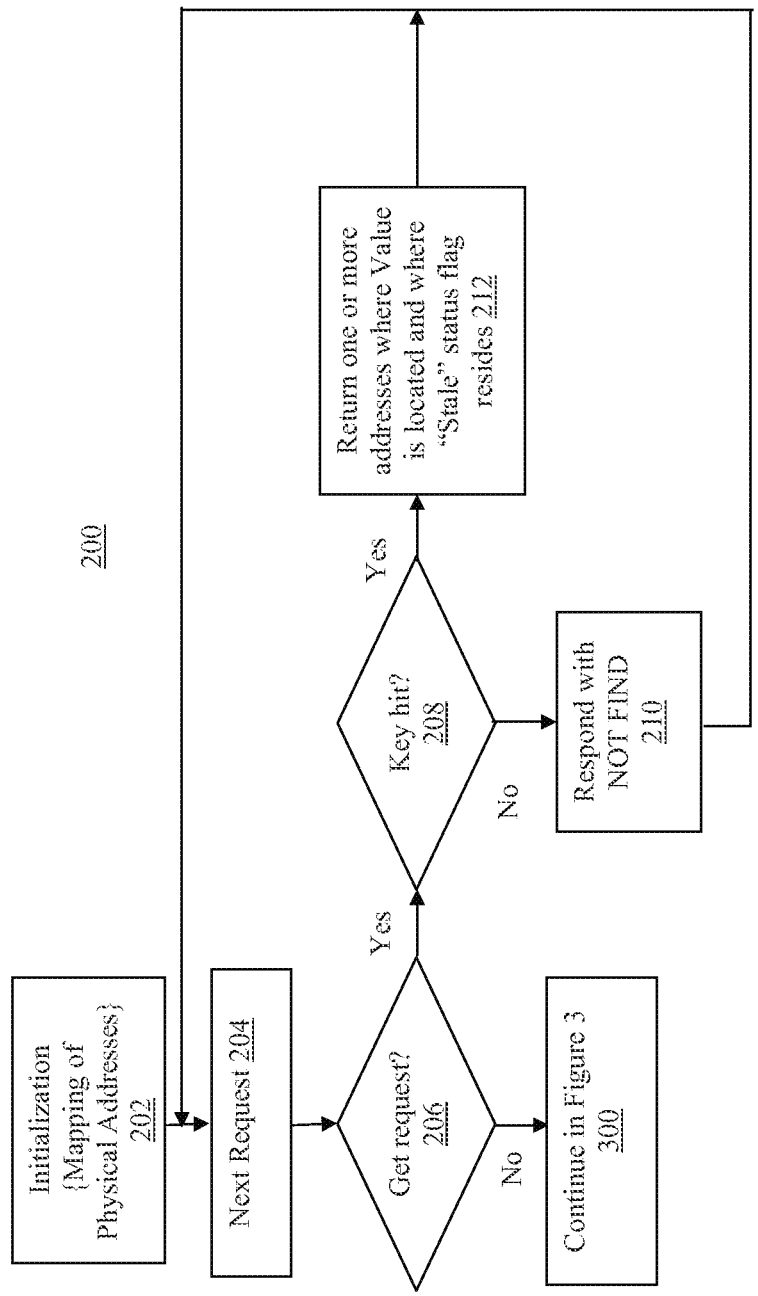
FIGS. 2-4 are flow diagrams illustrating various operation flows of the memcached logic on a server, according to the disclosed embodiments.
Figure 3:
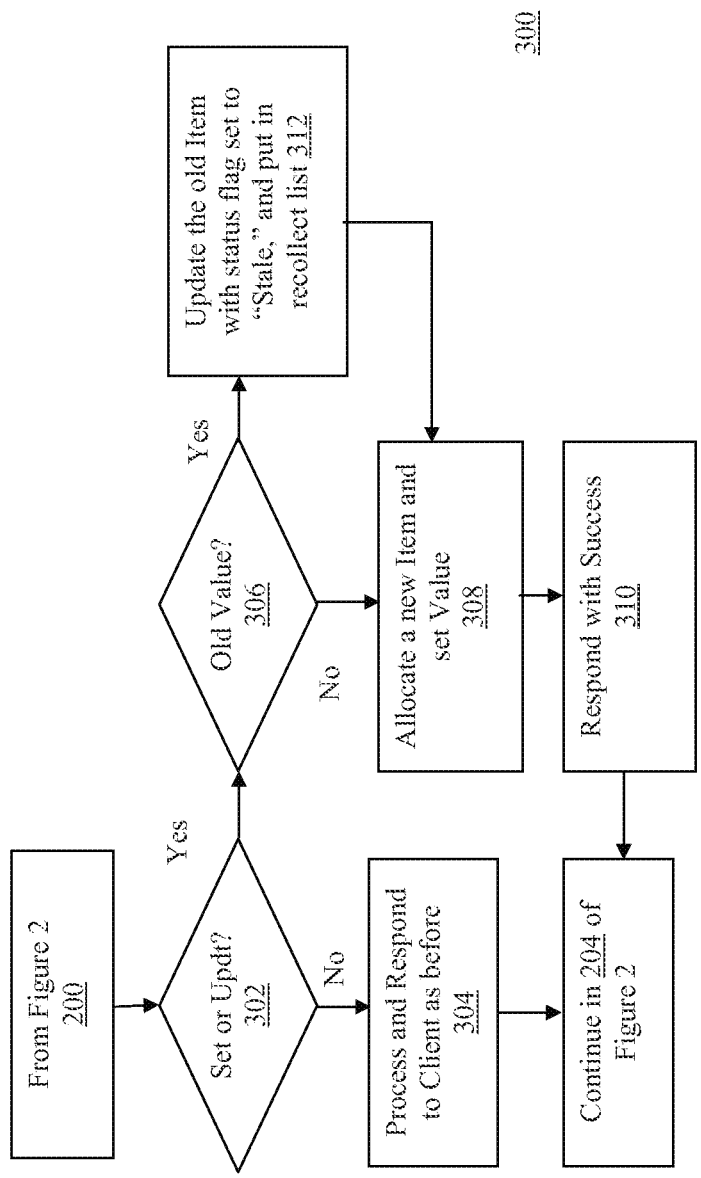
Figure 4:
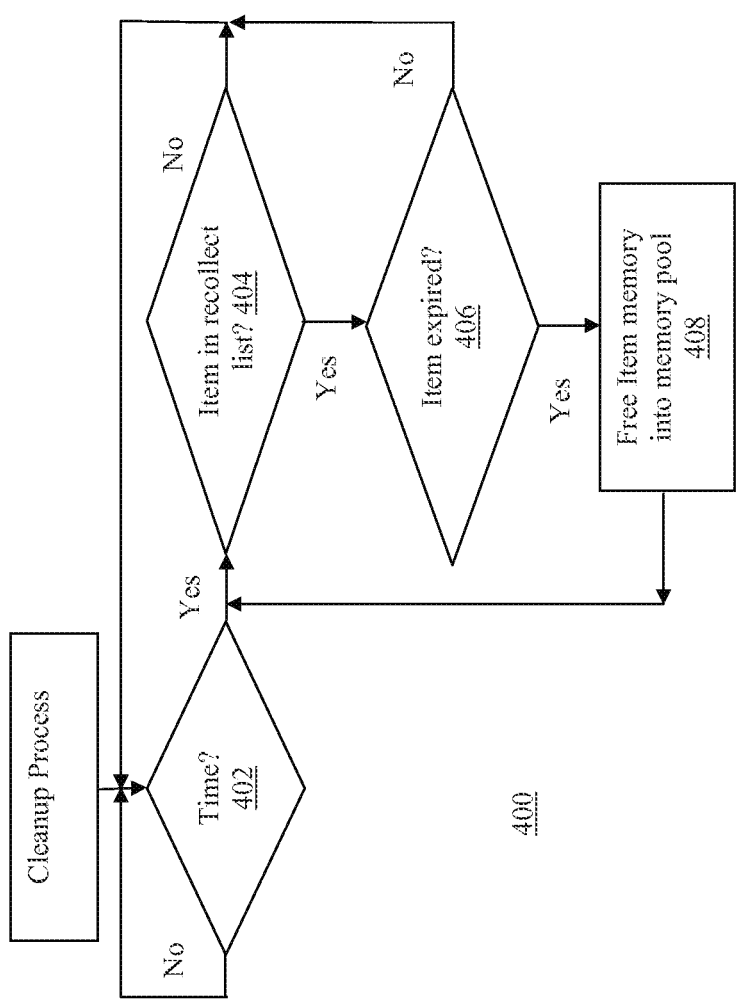

Referring now to FIGS. 2-4, wherein three flow diagrams illustrating various operations flows of the memcached logic on a server, according to the disclosed embodiments, are shown. As illustrated, the operation flows of server side memcached logic 124a or 124b may include processes 200 and 300 to service various request, and process 400 to maintain the server. The operation flow may start at block 202 where server side memcached logic 124a or 124b may go through a typical server initialization process of a memcached system. However, under the present disclosure, unlike existing memcached systems, during the initialization process, server side memcached logic 124a or 124b may map the physical addresses of its memory 122a or 122b into the address space of the memcached system. The potential advantage of mapping physical addresses, as opposed to virtual addresses, will be described later.

Next at block 204, server side memcached logic 124a or 124b may receive and begin service of a request from a client 102a, 102b or 102c. At block 206, on receipt of a request, server side memcached logic 124a or 124b may first determine whether the received request is a Get request to get a value corresponding to a key in the memcached system. If it is a Get request, the operation flow may continue at block 208, where server side memcached logic 124a or 124b may determine whether the key results in a hit. If a result of the determination indicates that the key does not result in a hit, the operation flow may continue at block 210, where server side memcached logic 124a or 124b may respond, e.g., with a message indicating the requested value for the key is not found. Thereafter, the operation flow may continue back at block 204, as earlier described.

However, if at block 208, a result of the determination indicates that the key results in a hit, the operation flow may continue at block 212, where server side memcached logic 124a or 124b may (in lieu of returning the requested value) return to the requesting client 102a, 102b, or 102c one or more addresses of one or more locations of the memcached system where the corresponding value of the key, and an associated status flag indicating whether the value is stale or not, are stored. What follows after client device 102a, 102b, or 102c on receipt of the one or more addresses will be described later when the operation flows of client devices 102a, 102b, or 102c is described with references to FIG. 5-7. In embodiments, an address of the location of corresponding value, and an address for the associated status flag are returned. In other embodiments, one address for a location where the corresponding value and the associated status flag are co-located is returned.

Back at block 206, if a result of the determination indicates that the request is not a Get request, the operation flow may continue in FIG. 3, starting at block 302. At block 302, server side memcached logic 124a or 124b may determine whether the request is a Set request. If a result of the determination indicates that the request is neither a Set nor an Update request, server side memcached logic 124a or 124b may process and service the request as in existing memcached systems. Thereafter, the operation flow may continue back at block 204 of FIG. 2, as earlier described.

On the other hand, if a result of the determination at block 302 indicates that it is a Set or Update request, the operation flow may continue at block 306. At block 306, server side memcached logic 124a or 124b may determine whether an old corresponding value exists for the key of the Set or Update request. If a result of the determination at block 306 indicates that no old corresponding value exists for the key of the Set or Update request, the operation flow may continue at block 308, where server side memcached logic 124a or 124b may proceed to allocate a new item in the memcached system for the key, and assign the item with the value provided by the Set or Update request. Next, at block 310, server side memcached logic 124a or 124b may respond to the request, e.g., with a message indicating the Set or Update request has been successfully completed. From block 310, the operation flow may continue at block 204 of FIG. 2 as earlier described.

Back at block 306, if a result of the determination at block 306 indicates that an old corresponding value exists for the key of the Set or Update request, the operation flow may continue at block 312, where server side memcached logic 124a or 124b may update a status flag associated with the key to reflect the old corresponding value as stale. Further, server side memcached logic 124a or 124b may add the item having the key and the old corresponding value onto a recollect list, to enable the memory allocated for the item to be subsequently recovered. In embodiments, the recollect list may be a first-in-first-out list. From block 312, the operation flow may continue at block 308 as earlier described.

In addition to the above operation flow to service a Get, a Set or an Update request, server side memcached logic 124a or 124b may also periodically perform maintenance process 400 (also referred to as a cleanup process) to recover memory allocated to items with values marked as "stale." Process 400 may start at block 402 where server side memcached logic 124a or 124b awaits the time to perform the maintenance process. Process 400 may continuously loop at block 402 until it is time to perform maintenance process 400. At such time, process 400 may continue at block 404. At block 404, server side memcached logic 124a or 124b may determine where any item has been added to the recollect list. If a result of the determination indicates that the recollect list is empty, meaning no item has their value marked stale since the last maintenance, process 400 may go to sleep, that is, return to block 402 and await the next point in time when maintenance is to be performed.

On the other hand, if it is determined at block 404 that the recollect list is not empty, meaning one or more items with stale values have been added, process 400 may continue at block 406. At block 406, server side memcached logic 124a or 124b may examine the next item in the recollect list, and determine whether the next item has expired. Expiration may be determined e.g., based on the amount of lapse time since the time when it is put into the recollect list. If the next item has not expired, for the illustrated embodiment where the recollect list is a first-in-first-out list, process 400 may also go to sleep, that is, return to block 402 and await the next point in time when maintenance is to be performed, as earlier described. In alternate embodiments, where the recollect list is not a first-in-first-out list, process 400 may return to block 404, and continue there from, as earlier described, instead.

On the other hand, if it is determined at block 406 that the examined item has expired, next at block 408, server side memcached logic 124a or 124b may free the memory allocated to the expired item back into the memory pool for reuse. Thereafter, process 400 may return to block 404, and continue as earlier described. The operations at blocks 404-408 may be repeated until no item in the recollect list is expired. On processing all items that are expired in the recollect list, process 400 may return to block 402, and continue therefrom as earlier described.

Figure 5:
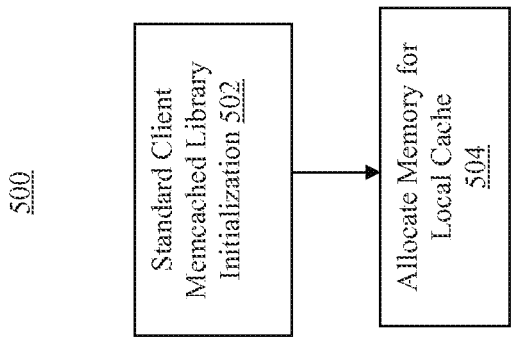

Referring now to FIGS. 5-7, wherein three flow diagrams illustrating various operations flows of the memcached logic on a client, according to the disclosed embodiments, are shown. As illustrated, the operation flows of client side memcached logic 114a, 114b or 114c may include initialization process 500, process 600 to service a Get request, and process 700 to service a Set request.

Initialization process 500 may begin at block 502 of FIG. 5, where client side memcached logic 114a, 114b or 114c may initialize itself on startup, as in existing memcached systems. However, for the disclosed embodiments, next at block 504, client side memcached logic 114a, 114b or 114c may allocate a block of the local memory to be used as local cache 116a, 116b or 116c.

Process 600 to service a Get request may start at block 602, where client side memcached logic 114a, 114b or 114c may try to locate a key of a Get request in local cache 116a, 116b or 116c. If the key does not result in a cache hit (or simply, hit), at block 606, client side memcached logic 114a, 114b or 114c may send the Get request to a server of the memcached system, as in existing memcached systems. In response, as described earlier, unlike existing memcached systems, client side memcached logic 114a, 114b or 114c, at block 608, may receive one or more addresses of one or more locations of the memcached system where the corresponding value of the key and the associated "stale" status flag are stored. Client side memcached logic 114a, 114b or 114c then cached the returned one or more addresses of the one or more locations of the memcached system where the corresponding value of the key and the associated "stale" status flag are stored. Next, at block 610, client side memcached logic 114a, 114b or 114c may perform a RDMA operation using the address of the value returned, and retrieve the corresponding value of the key. Thereafter, client side memcached logic 114a, 114b or 114c may return the retrieved value to the requestor of the Get request. From block 610, process 600 may end.

Note that by virtue of the nature of a RDMA operation, server side memcached logic 124a or 124b is not cognizant of the RDMA operation when client 102a, 102b or 102c retrieves the value, and thus the processors of servers 106a or 106b are not involved in servicing the actual retrieval of the corresponding values of the keys. In other words, under the present disclosure, processors of servers 106a or 106b will no longer be the bottle necks, constraining the amount of memory of server 106a or 106b Accordingly, under the present disclosure, it is expected, a much larger amount of memory, as compared to existing memcached systems, may be configured on each server 106*a* or 106*b*. In turn, compared to existing memcached systems, less servers 106*a* or 106*b* may be needed for an application, and the present disclosure, especially coupled with direct use of physical addresses in RDMA (in lieu of virtual addresses) may be more efficient and scalable. Further, due to the significant lower usage of the processors, servers 106*a* and 106*b* may consume a lot less power, and more energy efficient, when compared to existing memcached systems.

Still referring to FIG. 6, on the other hand, if a result of the determination at block 604 indicates the key results in a hit, process 600 may proceed to block 612. At block 612, memcached logic 114*a*, 114*b* or 114*c* may determine if the cache entry that yields the hit is expired. If the cache entry that yields the hit has not expired, memcached logic 114*a*, 114*b* or 114*c* may perform a RDMA operation using the one or more addresses of the value and the associated status flag stored in the cache entry that yields the cache hit, and retrieve the corresponding value of the key and the associated status flag. Expiration of a cache entry may be determined e.g., by comparing current system time with the time when the one or more addresses were retrieved from a memcached server. If the time difference is larger than a configured value, the cache entry may be determined as expired. Next at blocks 614-616, memcached logic 114*a*, 114*b* or 114*c* may check the status flag to determine if the retrieved value is stale. If it is determined at block 616 that the retrieved value is not stale, at block 618, memcached logic 114*a*, 114*b* or 114*c* may return the retrieved value to the requestor of the Get request. From block 618, process 600 may end.

However, if it is determined at block 612 that the cache entry that yields the hit has expired, or at block 616 that the retrieved value is stale, process 600 may continue at block 620. At block 620, memcached logic 114*a*, 114*b* or 114*c* may send the Get request to a server of the memcached system as in existing memcached systems. As described earlier, unlike existing memcached systems, at block 620, memcached logic 114*a*, 114*b* or 114*c* may receive, in response, one or more addresses of one or more locations of the memcached system where the corresponding value of the key and the associated status flag are stored. As described earlier for similar receipt, memcached logic 114*a*, 114*b* or 114*c* may update local cache 116*a*, 116*b* or 116*c*, store the returned one or more addresses in a new cache entry in local cache 116*a*, 116*b* or 116*c*, and invalidate the prior cache entry that yields the cache hit. In alternate embodiments, memcached logic 114*a*, 114*b* or 114*c* may update the prior cache entry that yields the cache hit instead. Next, at block 622, memcached logic 114*a*, 114*b* or 114*c* may perform an RDMA operation using the returned address of the value to retrieve the value as earlier discussed, and return the retrieved value to the requestor of the Get request. From block 622, process 600 may end.

Similarly, process 700 to service a Set request may begin at block 702, where memcached logic 114*a*, 114*b* or 114*c* may try to locate a key of a Set request in local cache 116*a*, 116*b* or 116*c*. If the key does result in a cache hit (or simply, hit) and is not expired, at block 706, memcached logic 114*a*, 114*b* or 114*c* may invalidate the cache entry that yields the cache hit, then proceed to block 708, else process 700 proceeds directly to block 708. At block 708 memcached logic 114*a*, 114*b* or 114*c* may process and service the Set request as in existing memcached systems. From block 708, process 700 may end.

Figure 8:
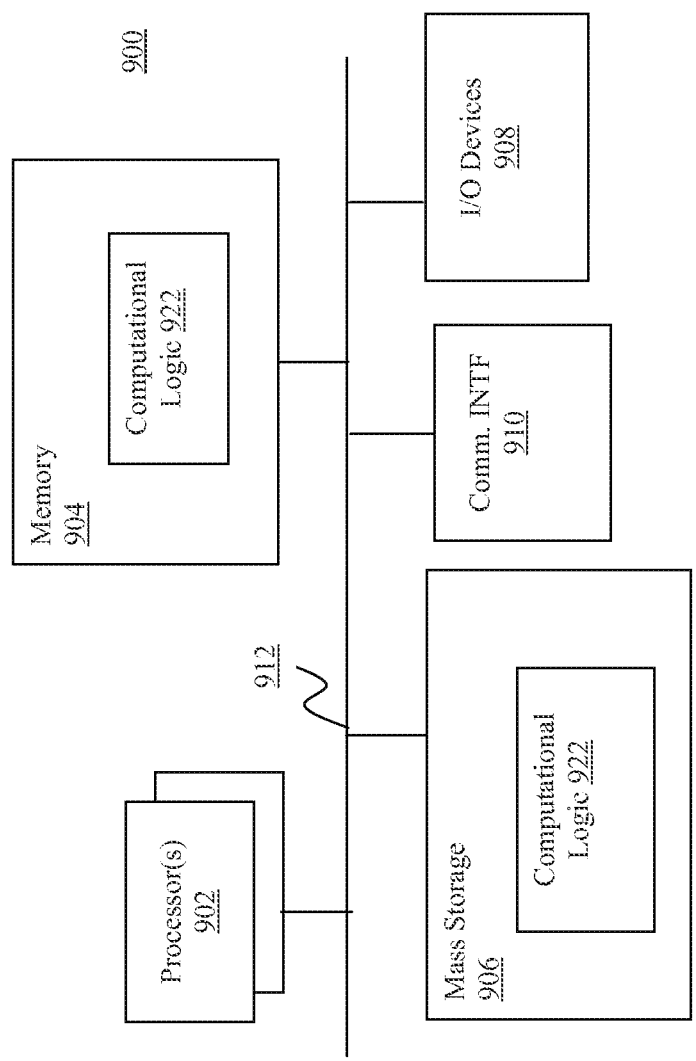
FIG. 8 illustrates an example computer system suitable for use to practice various aspects of the present disclosure, according to the disclosed embodiments.

FIG. 8 illustrates an example computer system that may be suitable for use as a client device or a server to practice selected aspects of the present disclosure. As shown, computer 900 may include one or more processors or processor cores 902, and system memory 904. For the purpose of this application, including the claims, the terms "processor" and "processor cores" may be considered synonymous, unless the context clearly requires otherwise. Additionally, computer 900 may include mass storage devices 906 (such as diskette, hard drive, compact disc read only memory (CD-ROM) and so forth), input/output devices 908 (such as display, keyboard, cursor control and so forth) and communication interfaces 910 (such as network interface cards, modems and so forth). The elements may be coupled to each other via system bus 912, which may represent one or more buses. In the case of multiple buses, they may be bridged by one or more bus bridges (not shown).

Each of these elements may perform its conventional functions known in the art. In particular, system memory 904 and mass storage devices 906 may be employed to store a working copy and a permanent copy of the programming instructions implementing the client or server side memcached logic 114*a*, 114*b*, 114*c*, 124*a* or 124*b*, earlier described, collectively referred to as computational logic 922. The various elements may be implemented by assembler instructions supported by processor(s) 902 or high-level languages, such as, for example, C, that can be compiled into such instructions.

The number, capability and/or capacity of these elements 910-912 may vary, depending on whether computer 900 is used as a client device or a server. In particular, when use as client device, the capability and/or capacity of these elements 910-912 may vary, depending on whether the client device is a stationary or mobile device, like a smartphone, computing tablet, ultrabook or laptop. Otherwise, the constitutions of elements 910-912 are known, and accordingly will not be further described.

Figure 9:
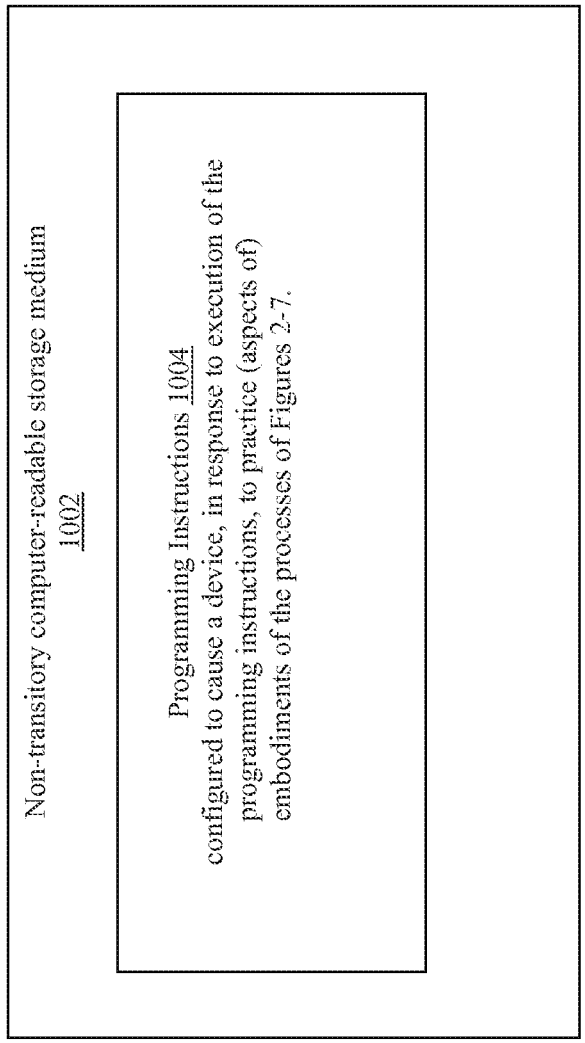
FIG. 9 illustrates a storage medium having instructions for practicing methods described with references to FIGS. 2-7, according to disclosed embodiments.

As will be appreciated by one skilled in the art, the present disclosure may be embodied as methods or computer program products. Accordingly, the present disclosure, in addition to being embodied in hardware as earlier described, may take the form of an entirely software embodiment (including firmware, resident software, micro-code, etc.) or an embodiment combining software and hardware aspects that may all generally be referred to as a "circuit," "module" or "system." Furthermore, the present disclosure may take the form of a computer program product embodied in any tangible or non-transitory medium of expression having computer-usable program code embodied in the medium. FIG. 9 illustrates an example computer-readable non-transitory storage medium that may be suitable for use to store instructions that cause an apparatus, in response to execution of the instructions by the apparatus, to practice selected aspects of the present disclosure. As shown, non-transitory computer-readable storage medium 1002 may include a number of programming instructions 1004. Programming instructions 1004 may be configured to enable a device, e.g., computer 900, in response to execution of the programming instructions, to perform, e.g., various operations associated with client or server side memcached logic 114*a*, 114*b*, 114*c*, 124*a* or 124*b*. In alternate embodiments, programming instructions 1004 may be disposed on multiple computer-readable non-transitory storage media 1002 instead. In alternate embodiments, programming instructions 904 may be disposed on computer-readable transitory storage media 1002, such as, signals.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a," "an" and "the" are intended to include plural forms as well, unless the context clearly indicates otherwise. It will be further understood that the terms "comprises" and/or "comprising," when used in this specification, specific the presence of stated features, integers, steps, operations, elements, and/or components, but do not preclude the presence or addition of one or more other features, integers, steps, operation, elements, components, and/or groups thereof.

Embodiments may be implemented as a computer process, a computing system or as an article of manufacture such as a computer program product of computer readable media. The computer program product may be a computer storage medium readable by a computer system and encoding a computer program instructions for executing a computer process.

The corresponding structures, material, acts, and equivalents of all means or steps plus function elements in the claims below are intended to include any structure, material or act for performing the function in combination with other claimed elements are specifically claimed. The description of the present disclosure has been presented for purposes of illustration and description, but is not intended to be exhaustive or limited to the disclosure in the form disclosed. Many modifications and variations will be apparent to those of ordinary skill without departing from the scope and spirit of the disclosure. The embodiment was chosen and described in order to best explain the principles of the disclosure and the practical application, and to enable others of ordinary skill in the art to understand the disclosure for embodiments with various modifications as are suited to the particular use contemplated.

Referring back to FIG. 9, for one embodiment, at least one of processors 902 may be packaged together with memory having computational logic 922 (in lieu of storing on memory 904 and storage 906). For one embodiment, at least one of processors 902 may be packaged together with memory having computational logic 922 to form a System in Package (SiP). For one embodiment, at least one of processors 902 may be integrated on the same die with memory having computational logic 922. For one embodiment, at least one of processors 802 may be packaged together with memory having computational logic 922 to form a System on Chip (SoC). For at least one embodiment, the SoC may be utilized in, e.g., but not limited to, a smartphone or computing tablet.

Thus various example embodiments of the present disclosure have been described including, but are not limited to:

Example 1 may be a client apparatus of a memcached system that includes memory and one or more processors coupled with the memory. The client apparatus may further include memcached logic operated by the one or more processors to receive a request to Get, Set or Update a value corresponding to a key in the memcached system, determine, in response to receipt of the request, whether the key results in a hit in a local cache maintained in memory by the memcached logic, and service the Get, Set or Update request based at least in part on whether a result of the determine indicates the key results in a hit in the local cache.

Example 2 may be example 1, wherein the memcached logic is to further allocate or cause to be allocated storage spaces within the memory for the local cache.

Example 3 may be example 1 or 2, wherein for a Get request with the key results in a hit, service comprises access the local cache to retrieve one or more addresses of one or more locations of the memcached system where the value and an associated status flag of the value are stored; perform a remote direct memory access operation on a server of the memcached system to retrieve the value and the associated status flag using the one or more addresses retrieved from the local cache; and determine whether the value retrieved through the remote direct memory access operation is stale, based at least in part on the status flag retrieved through the remote direct memory access operation.

Example 4 may be example 3, wherein for a Get request with the key results in a hit, service further comprises return the retrieved value, in response to a result of the stale determination indicating the value is not stale.

Example 5 may be example 3, wherein for a Get request with the key results in a hit, service further comprises in response to a result of the stale determination indicating the value is stale, transmit the Get request to a server of the memcached system to request the value; receive second one or more addresses of second one or more locations of the memcached system where the value and an associated status flag of the value are stored; perform a remote direct memory access operation on a server of the memcached system to retrieve the value and the associated status flag using the second one or more addresses received; update the local cache to store the third and fourth addresses for the key; and return the value received.

Example 6 may be any one of examples 1-5, wherein for a Set request with the key not results in a hit, service comprises transmit the Get request to a server of the memcached system to request the value; receive one or more addresses of one or more locations of the memcached system where the value, and an associated status flag of the value are stored; perform a remote direct memory access operation on a server of the memcached system to retrieve the value and the associated status flag using the one or more addresses received; and return the value received.

Example 7 may be any one of claims 1-6, wherein for a Set request, service comprises in response to the key results in a hit, invalidate a cache entry in the local cache that yielded the hit; and send the Set request to a server of the memcached system.

Example 8 may be example 3, wherein perform a remote direct memory access comprises first determine a cache entry that yields the hit has not expired.

Example 9 may be a server apparatus of a memcached system that includes memory; one or more processors coupled with the memory; and network interface card equipped to support remote memory direct access. The server apparatus may further include memcached logic operated by the one or more processors to receive a request to Get an value corresponding to a key in the memcached system, determine whether the key results in a hit, and in response to the key results in a hit, return one or more addresses of one or more locations of the memcached system where the value and a status flag associated with the value are stored.

Example 10 may be example 9, wherein the memcached logic to further receive a request to Update a second key in the memcached system with a second corresponding value, determine whether the second key results in a hit, and in response to the second key results in a hit, update a second status flag associated with a first item that yields the hit for the second key with a stale status, add the first item to a collect list, create a second item for the second key, and assign the second item with the second value.

Example 11 may be example 9 or 10, wherein the memcached logic to further periodically perform a maintenance operation to recover memory allocated to items having associated status flags with a stale status.

Example 12 may be any one of examples 9-11, wherein the memcached logic to further map physical addresses of the memory to an address space of the memcached system.

Example 13 may be a method for memory caching data that includes receiving, by a client device of a memcached system, a request to Get, Set, or Update a value corresponding to a key in the memcached system; determining, by the client device, in response to the receipt of the request, whether the key results in a hit in a local cache maintained in memory of the client device, and servicing, by the client device, the Get, Set, or Update request based at least in part on whether a result of the determine indicates the key results in a hit in the local cache.

Example 14 may be example 13, further comprising the client device allocating storage spaces within the memory for the local cache.

Example 15 may be example 13 or 14, wherein for a Get request with the key results in a hit, servicing comprises accessing the local cache to retrieve one or more addresses of one or more locations of the memcached system where the value and an associated status flag of the value are stored; performing a remote direct memory access operation on a server of the memcached system to retrieve the value and the associated status flag using the one or more addresses retrieved from the local cache; and determining whether the value retrieved through the remote direct memory access operation is stale, based at least in part on the status flag retrieved through the remote direct memory access operation.

Example 16 may be example 15, wherein for a Get request with the key results in a hit, servicing further comprises returning the retrieved value, in response to a result of the stale determination indicating the value is not stale.

Example 17 may example 15 or 16, wherein for a Get request with the key results in a hit, servicing further comprises in response to a result of the stale determination indicating the value is stale; transmitting the Get request to a server of the memcached system to request the value; receiving second one or more addresses of second one or more locations of the memcached system where the value and an associated status flag of the value are stored; performing a remote direct memory access operation on a server of the memcached system to retrieve the value and the associated status flag using the second one or more addresses received; updating the local cache to store second or more addresses for the key; and returning the value received.

Example 18 may be any one of examples 13-17, wherein for a Get request with the key not results in a hit, servicing comprises transmitting the Get request to a server of the memcached system to request the value; receiving one or more addresses of one or more locations of the memcached system where the value and an associated status flag of the value is stored; performing a remote direct memory access operation on a server of the memcached system to retrieve the value and the associated status flag using the one or more addresses received; and returning the value received.

Example 19 may be any one of examples 13-18, wherein for a Set request, servicing comprises in response to the key results in a hit, invalidating a cache entry in the local cache that yielded the hit; and sending the Set request to a server of the memcached system.

Example 20 may be example 15, wherein performing a remote direct memory access operation comprises first determining that a cache entry that yields the hit has not expired.

Example 21 may be a method for memory caching data that includes receiving, by a server of a memcached system, a request to Get an value corresponding to a key, determining, by the server, whether the key results in a hit, and in response to the key results in a hit, returning, by the server, one or more addresses of one or more locations of the memcached system where the value and a status flag associated with the value are stored.

Example 22 may be example 21, further comprising receiving, by the server, a request to Update a second key in the memcached system with a second corresponding value, determine, by the server, whether the second key results in a hit, and in response to the second key results in a hit, the server, updating a second status flag associated with a first item that yields the hit for the second key with a stale status, adding the first item to a collect list, creating a second item for the second key, and assigning the second item with the second value.

Example 23 may be example 21 or 22, further comprising periodically performing, by the server, a maintenance operation to recover memory allocated to items having associated status flags with a stale status.

Example 24 may be any one of examples 21-23, further comprising mapping, by the server, physical addresses of memory of the server to an address space of the memcached system.

Example 25 may be one or more storage medium comprising a plurality of instructions, in response to execution of the instructions by a client apparatus, to cause the client apparatus to perform any one of the methods of examples 13-18.

Example 26 may be one or more storage medium comprising a plurality of instructions, in response to execution of the instructions by a server apparatus, to cause the server apparatus to perform any one of the methods of example 19-24.

Example 27 may be a client apparatus comprising means for performing any one of the methods of examples 13-18.

Example 28 may be a client apparatus comprising means for performing any one of the methods of example 19-24.

It will be apparent to those skilled in the art that various modifications and variations can be made in the disclosed embodiments of the disclosed device and associated methods for memcached without departing from the spirit or scope of the disclosure, including application to other caching applications, storage applications or appliances. Thus, it is intended that the present disclosure covers the modifications and variations of the embodiments disclosed above provided that the modifications and variations come within the scope of any claims and their equivalents.

What is claimed is:

1. A client apparatus of a memcached system, comprising:
   memory;
   one or more processors coupled with the memory; and
   memcached logic stored in the memory, and operated by the one or more processors to:
      maintain a local cache in the memory of the client apparatus of the memcached system to store a subset of key-value pairs stored in one or more servers of the memcached system,
      receive a request to Update a value corresponding to a key in one of the key-value pairs of the memcached system,
      determine, in response to receipt of the request, whether the key results in a hit in the local cache maintained in the memory of the client apparatus of the memcached system, and
      service the Update request based at least in part on whether a result of the determine indicates the key results in a hit in the local cache of the client apparatus of the memcached system.

2. The client apparatus of claim 1, wherein the memcached logic is to further allocate or cause to be allocated storage spaces within the memory for the local cache.

3. The client apparatus of claim 1, wherein for a Get request with the key not results in a hit, service comprises:
   transmit the Get request to a server of the memcached system to request the value;
   receive one or more addresses of one or more locations of the memcached system where the value, and an associated status flag of the value are stored;
   perform a remote direct memory access operation on a server of the memcached system to retrieve the value and the associated status flag using the one or more addresses received; and
   return the value received.

4. A client apparatus of a memcached system, comprising:
   memory;
   one or more processors coupled with the memory; and
   memcached logic operated by the one or more processors to:
      receive a request to Get a value corresponding to a key in the memcached system, determine, in response to receipt of the Get request, whether the key results in a hit in a local cache maintained in memory by the memcached logic, and service the Get request based at least in part on whether a result of the determine indicates the key results in a hit in the local cache;

wherein for a Get request with the key results in a hit, service comprises access the local cache to retrieve one or more addresses of one or more locations of the memcached system where the value and an associated status flag of the value are stored;

perform a remote direct memory access operation on a server of the memcached system to retrieve the value and the associated status flag using the one or more addresses retrieved from the local cache; and determine whether the value retrieved through the remote direct memory access operation is stale, based at least in part on the status flag retrieved through the remote direct memory access operation.

5. The client apparatus of claim 4, wherein for a Get request with the key results in a hit, service further comprises return the retrieved value, in response to a result of the stale determination indicating the value is not stale.

6. The client apparatus of claim 4, wherein for a Get request with the key results in a hit, service further comprises:

in response to a result of the stale determination indicating the value is stale, transmit the Get request to a server of the memcached system to request the value;

receive second one or more addresses of second one or more locations of the memcached system where the value and an associated status flag of the value are stored;

perform a remote direct memory access operation on a server of the memcached system to retrieve the value and the associated status flag using the second one or more addresses received;

update the local cache to store the third and fourth addresses for the key; and return the value received.

7. The client apparatus of claim 4, wherein perform a remote direct memory access comprises first determine a cache entry that yields the hit has not expired.

8. A server apparatus of a memcached system, comprising:

memory;

one or more processors coupled with the memory;

network interface card equipped to support remote memory direct access; and memcached logic stored in the memory and operated by the one or more processors to:

receive a request to Update a key from a client device of the memcached system in the memcached system with a corresponding value, wherein the client device maintains a local cache on the client device storing a subset of key-value pairs stored by the server apparatus and one or more other server apparatuses of the memcached system determine whether the key results in a hit, and in response to the key results in a hit, service the request to Update the key, by updating a status flag associated with a first item that yields the hit for the key with a stale status, adding the first item to a collect list, creating a second item for the key, and assigning the second item with the value.

9. The server of apparatus of claim 8, wherein the memcached logic to further periodically perform a maintenance operation to recover memory allocated to items having associated status flags with a stale status.

10. The server of apparatus of claim 8, wherein the memcached logic to further map physical addresses of the memory to an address space of the memcached system.

11. A method for memory caching data, comprising:

receiving from a client device of a memcached system, by a server of the memcached system, a request to Update a key in the memcached system with a corresponding value, wherein the client device maintains a local cache on the client device storing a subset of key-value pairs stored by the server and one or more other servers of the memcached system determining, by the server, whether the key results in a hit, and in response to the key results in a hit, servicing, by the server, the request to Update the key, by updating a status flag associated with a first item that yields the hit for the key with a stale status, adding the first item to a collect list, creating an item for the key, and assigning the item with the value.

12. The method of claim 11, further comprising periodically performing, by the server, a maintenance operation to recover memory allocated to items having associated status flags with a stale status.

13. The method of claim 11, further comprising mapping, by the server, physical addresses of memory of the server to an address space of the memcached system.

14. At least one non-transitory computer-readable medium comprising a plurality of instructions, in response to execution of the instructions by a client apparatus of a memcached system, to cause the client apparatus to:

maintain a local cache in a memory of the client apparatus of the memcached system to store a subset of key-value pairs stored in one or more servers of the memcached system;

receive a request to Update a value corresponding to a key in one of the key-value pairs of the memcached system;

determine, in response to the receipt of the Update request, whether the key results in a hit in the local cache maintained in memory of the client apparatus of the memcached system; and service, the Update request based at least in part on whether a result of the determine indicates the key results in a hit in the local cache of the client apparatus of the memcached system.

15. The non-transitory computer-readable medium of claim 14, wherein the client apparatus of a memcached system is further caused to allocate storage spaces within the memory for the local cache.

16. At least one non-transitory computer-readable medium comprising a plurality of instructions, in response to execution of the instructions by a client apparatus, to cause the client apparatus to:

receive a request to Get a value corresponding to a key in the memcached system;

determine, in response to the receipt of the Get request, whether the key results in a hit in a local cache maintained in memory of the client apparatus; and service, the Get request based at least in part on whether a result of the determine indicates the key results in a hit in the local cache;

wherein for a Get request with the key results in a hit, service comprises access the local cache to retrieve one or more addresses of one or more locations of the memcached system where the value and an associated status flag of the value are stored;

perform a remote direct memory access operation on a server of the memcached system to retrieve the value and the associated status flag using the one or more addresses retrieved from the local cache; and determine whether the value retrieved through the remote direct memory access operation is stale, based at least in part on the status flag retrieved through the remote direct memory access operation.

17. The non-transitory computer-readable medium of claim 16, wherein for a Get request with the key results in a hit, service further comprises return the retrieved value, in response to a result of the stale determination indicating the value is not stale.

18. The non-transitory computer-readable medium of claim 16, wherein for a Get request with the key results in a hit, service further comprises:

in response to a result of the stale determination indicating the value is stale, transmit the Get request to a server of the memcached system to request the value;

receive second one or more addresses of second one or more locations of the memcached system where the value and an associated status flag of the value are stored;

perform a remote direct memory access operation on a server of the memcached system to retrieve the value and the associated status flag using the second one or more addresses received;

update the local cache to store second or more addresses for the key; and return the value received.

19. The non-transitory computer-readable medium of claim 16, wherein for a Get request with the key not results in a hit, service comprises:

transmit the Get request to a server of the memcached system to request the value;

receive one or more addresses of one or more locations of the memcached system where the value and an associated status flag of the value is stored;

perform a remote direct memory access operation on a server of the memcached system to retrieve the value and the associated status flag using the one or more addresses received; and return the value received.

20. The non-transitory computer-readable medium of claim 16, wherein perform a remote direct memory access operation comprises first determine that a cache entry that yields the hit has not expired.

* * * * *

UNITED STATES PATENT AND TRADEMARK OFFICE
CERTIFICATE OF CORRECTION

PATENT NO. : 10,277,707 B2
APPLICATION NO. : 14/778026
DATED : April 30, 2019
INVENTOR(S) : Xiangbin Wu et al.

Page 1 of 1

It is certified that error appears in the above-identified patent and that said Letters Patent is hereby corrected as shown below:

In the Claims

Column 16
Line 45 "service,..." should read – "service..."
Line 63 "service,..." should read – "service..."

Signed and Sealed this
Sixth Day of August, 2019

Andrei Iancu
*Director of the United States Patent and Trademark Office*